(12) United States Patent
Behrendt et al.

(10) Patent No.: US 8,209,957 B2
(45) Date of Patent: Jul. 3, 2012

(54) HEATABLE HOSE CONDUIT SYSTEM FOR AN EXHAUST-GAS AFTERTREATMENT SYSTEM OF AN INTERNAL COMBUSTION ENGINE

(75) Inventors: Waldemar Behrendt, Bruchköbel (DE); Christof Kirsch, Niddatal (DE)

(73) Assignee: ContiTech Techno-Chemie GmbH, Karben (DE)

( * ) Notice: Subject to any disclaimer, the term of this patent is extended or adjusted under 35 U.S.C. 154(b) by 912 days.

(21) Appl. No.: 12/285,585

(22) Filed: Oct. 9, 2008

(65) Prior Publication Data
US 2009/0064666 A1    Mar. 12, 2009

Related U.S. Application Data

(63) Continuation of application No. PCT/EP2007/052947, filed on Mar. 28, 2007.

(30) Foreign Application Priority Data

Apr. 13, 2006   (DE) .......................... 10 2006 017 399

(51) Int. Cl.
*F01N 3/36* (2006.01)
(52) U.S. Cl. ........... 60/286; 60/298; 60/303; 285/124.4; 285/124.5
(58) Field of Classification Search ............. 60/286, 60/298, 303; 285/124.4, 124.5, 125.1, 126.1, 285/129.1
See application file for complete search history.

(56) References Cited

U.S. PATENT DOCUMENTS

| | | | | |
|---|---|---|---|---|
| 2,876,023 A * | 3/1959 | Ford | ............................ | 285/124.4 |
| 3,570,534 A * | 3/1971 | Beavers | ........................ | 137/594 |
| 4,089,549 A * | 5/1978 | Vyse et al. | .................. | 285/124.4 |
| 4,345,786 A * | 8/1982 | Egert | .......................... | 285/124.4 |
| 4,768,492 A * | 9/1988 | Widmer et al. | ............... | 123/541 |
| 5,692,783 A * | 12/1997 | Watanabe et al. | .............. | 285/61 |
| 5,860,676 A * | 1/1999 | Brzezicki et al. | ................ | 285/24 |
| 5,884,475 A * | 3/1999 | Hofmann et al. | ............... | 60/274 |
| 5,964,206 A * | 10/1999 | White et al. | ................... | 123/541 |
| 5,964,481 A * | 10/1999 | Buch | ............................... | 285/18 |
| 6,550,815 B2 * | 4/2003 | Zitkowic et al. | ........... | 285/120.1 |
| 6,739,126 B2 | 5/2004 | Huthwohl | | |
| 2002/0163188 A1 * | 11/2002 | Cooke et al. | ............... | 285/124.1 |

FOREIGN PATENT DOCUMENTS

| | | |
|---|---|---|
| DE | 199 35 920 | 3/2001 |
| EP | 1 698 769 | 9/2006 |
| EP | 1 770 251 | 4/2007 |
| WO | WO 03/016687 | 2/2003 |

\* cited by examiner

*Primary Examiner* — Kenneth Bomberg
*Assistant Examiner* — Jorge Leon, Jr.
(74) *Attorney, Agent, or Firm* — Walter Ottesen

(57) ABSTRACT

A heatable hose conduit system is provided for an arrangement for the aftertreatment of exhaust gas in an internal combustion engine. The arrangement introduces a liquid reduction agent into the exhaust gas of the engine. The heatable hose conduit system has hose conduits that conduct the liquid reduction agent and are arranged in pairs in close proximity to hose conduits that conduct heating water. At least one end of at least one pair of hose conduits (6, 7 or 8, 9) terminates at a common connecting block that has a plug member of a plug-and-socket connector. The liquid reduction agent is conducted via the connecting block into the interior of the unit (11) to be connected and the heating water is conducted through a throughflow channel (20) which has an outlet outside the unit (11).

2 Claims, 6 Drawing Sheets

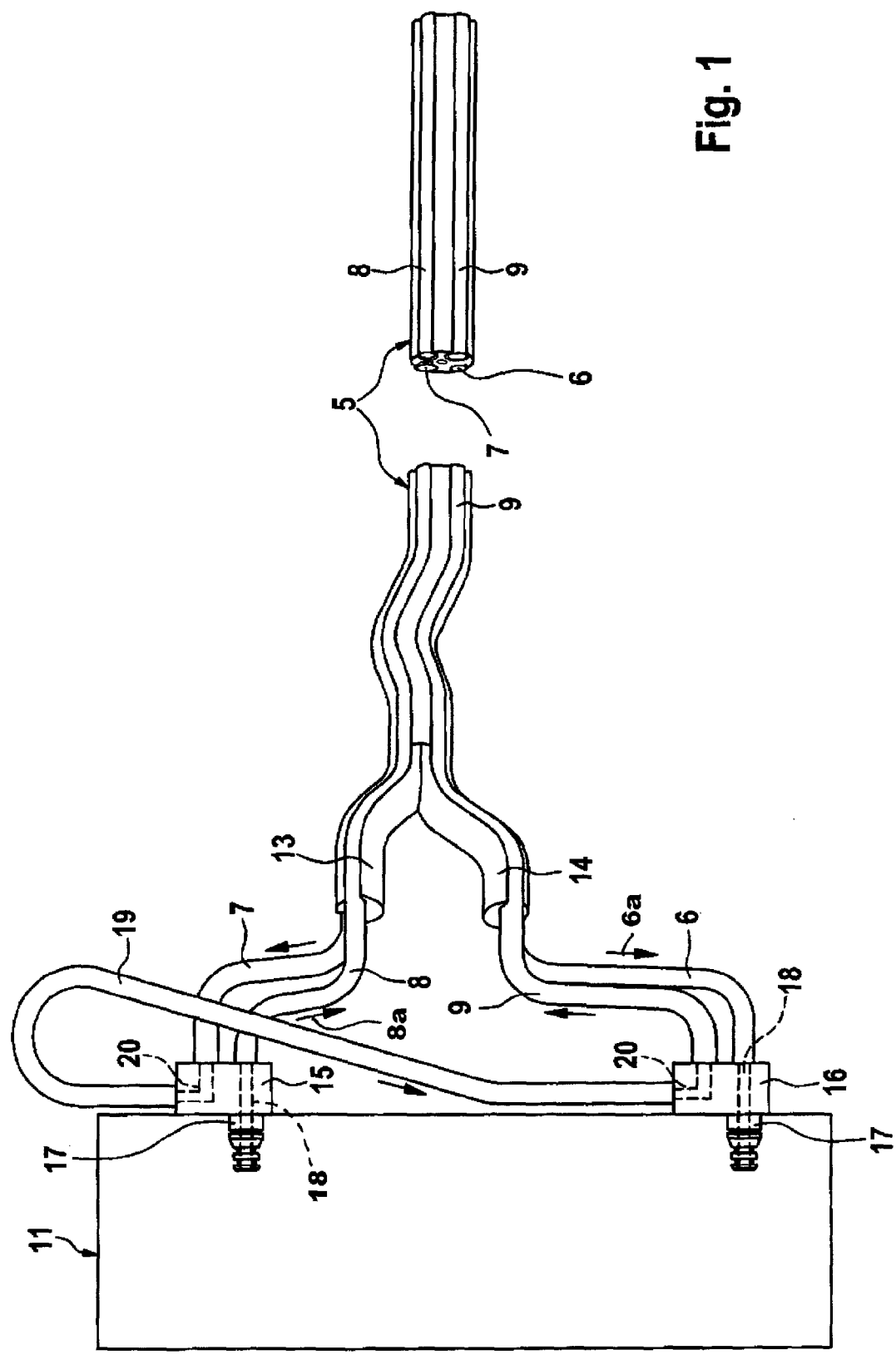

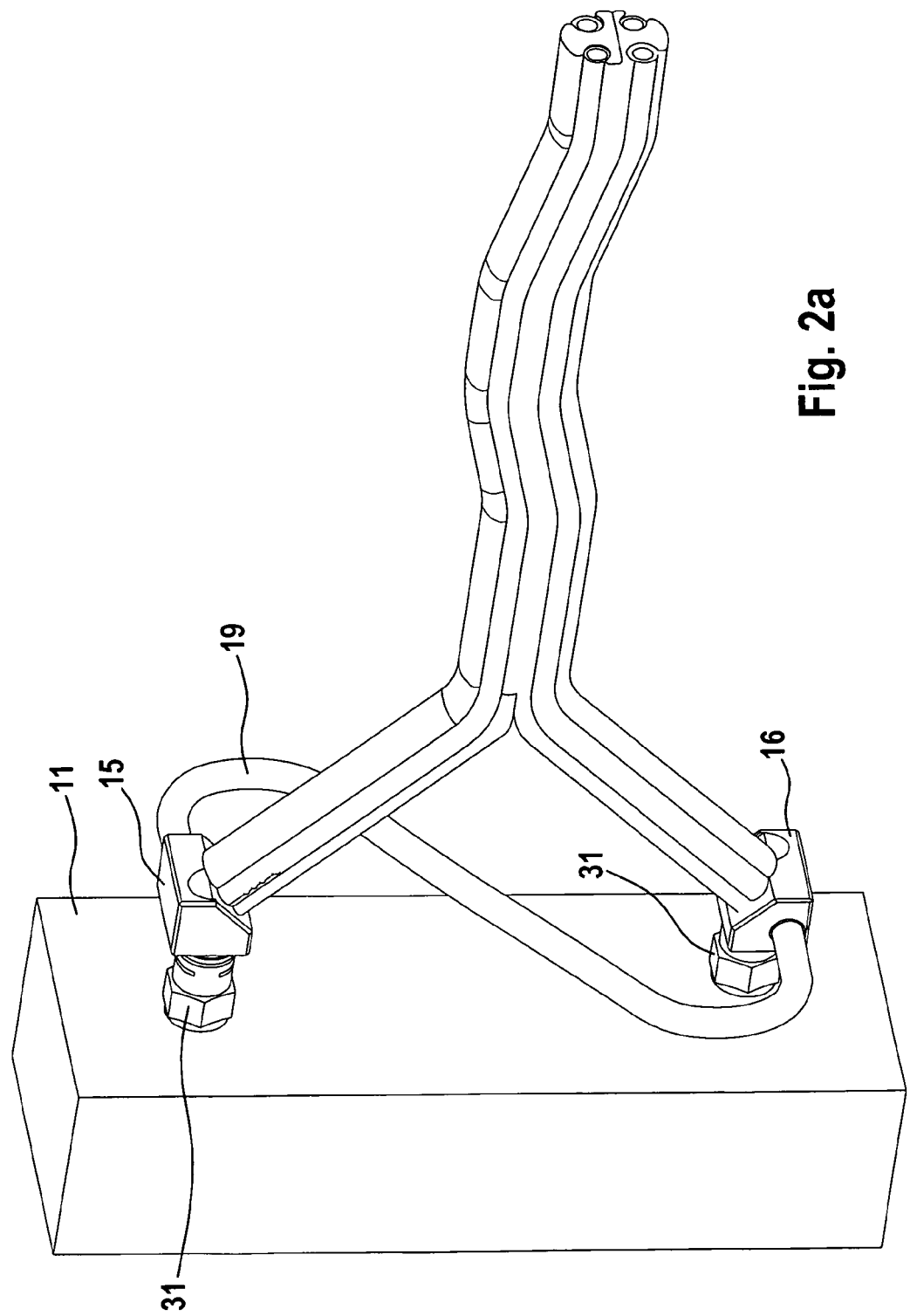

HEATABLE HOSE CONDUIT SYSTEM FOR AN EXHAUST-GAS AFTERTREATMENT SYSTEM OF AN INTERNAL COMBUSTION ENGINE

CROSS REFERENCE TO RELATED APPLICATIONS

This application is a continuation application of international patent application PCT/EP 2007/052947, filed Mar. 28, 2007, designating the United States and claiming priority from German application 10 2006 017 399.6, filed Apr. 13, 2006, and the entire content of both applications is incorporated herein by reference.

FIELD OF THE INVENTION

The invention relates to a heatable hose conduit system for the exhaust-gas aftertreatment of an internal combustion engine.

BACKGROUND OF THE INVENTION

To reduce nitrogen oxide emissions of an internal combustion engine, it is known to convert nitrogen oxide into atmospheric nitrogen and water vapor by means of the selective catalytic reduction (SCR) technology. An aqueous urea solution is used as a reducing agent and is carried in a separate supply vessel. The aqueous urea solution is moved out of the supply vessel by a feed module or a pump and is supplied to a metering module, from which the urea solution is injected in a dosed or metered manner into the exhaust-gas flow upstream of the catalytic converter. Excess reducing agent is conducted by the feed module back into the storage vessel via a return conduit.

Hose conduits for conveying the reducing agent are provided between the supply vessel, the feed module and the metering module. These hose conduits must be connected to the above units to establish the fluid connection. So-called plug-and-socket connections have proven to be advantageous for this purpose since these plug-and-socket connections simplify assembly. The respective hose end is fitted with a plug member or socket member which matches a corresponding plug receptacle on the unit which is to be fluidically connected.

The hose conduits between the supply vessel and the exhaust-gas conduit must be heatable, since there is risk of the aqueous urea solution freezing below −11° C. It is known to avert the risk of freezing by using electrically heatable hoses. Although these electrically heatable hoses have been shown to be effective, there are applications in which this technical solution cannot work, for example, if too little electrical power is available.

It is also possible to arrange a hose conduit, which conducts heating water, in a paired fashion, in close proximity to a hose conduit which conducts reducing agent so as to transfer heat to the latter. The heating water heats the hose conduit conducting the same and transfers the heat energy to the hose conduit conducting the urea solution because of their close proximity. Heating cooling water, which is branched off from the cooling water circuit of the internal combustion engine, can be used as heating water.

With this arrangement, which forms at least one hose conduit pair, freezing of the urea solution in the hose conduits is substantially prevented. There is still the risk of freezing in the plug-and-socket connections themselves. Furthermore, the high number of plug-and-socket connections is disadvantageous, since the hose conduits which conduct heating water must likewise be connected, within their loops, to the units.

SUMMARY OF THE INVENTION

It is an object of the invention to provide a heatable hose conduit system of the kind described above which prevents the freezing of the aqueous urea solution even in the connections of the hose conduits to the units which are to be connected.

The heatable hose conduit system of the invention is for an exhaust-gas aftertreatment arrangement of an internal combustion engine wherein a liquid urea reducing agent is introduced into the exhaust gas of the engine to effect a selective catalytic reduction of nitrous oxide from the exhaust gas. The aftertreatment arrangement includes a vessel unit for accommodating the reducing agent, a pump unit to move the reducing agent and a metering unit having a metering valve for injecting the reducing agent into the flow of exhaust gas ahead of a catalytic converter. The heatable hose conduit system of the invention includes: a first hose conduit for conducting the liquid urea reducing agent between two of the units; a second hose conduit for conducting heated water between the two units; the first and second hose conduits being arranged as a conduit pair in close proximity to each other so as to facilitate a transfer of heat from the second hose conduit to the first hose conduit; a connecting block; the conduit pair having an end terminating at the connecting block; the connecting block and one of the units conjointly defining an interface; a plug-and-socket connector disposed at the interface and the connector having a plug member and a socket member; the connecting block having one of the members for mating with the other one of the members; the connecting block having a first through-flow channel communicating with the interior of the one unit for conducting the reducing agent between the interior and the first hose conduit; the connecting block having a second through-flow channel for conducting the heated water running in the second hose conduit; and, the second through-flow channel having an outlet lying external to the one unit.

In each case, one urea solution hose conduit is guided together with a heating water hose and is thereby heated. These two hose conduits terminate at a common connecting block which is designed such that the heating water flows therethrough, while the urea solution ends in the unit. This has the advantage that not only the hose conduits but also the connecting parts of the hose conduits, in this case the connecting blocks, are thawed out. These connecting blocks can be made as cost-effective injection-molded parts or can be soldered from a metal which is resistant to urea and, as a result, the thermal conductivity can be considerably increased.

For the connection to the units, the connecting blocks are fitted with plug-and-socket connectors. The connections of the heating water conduits form the connections of the feed conduit and return conduit.

The connecting member of the particular connecting block can be formed either as a plug member or as a socket member which fits into a corresponding socket member or plug member on the particular unit.

In an advantageous embodiment of the invention, the hose nipples, which are attached to the particular connecting block, are soldered-in pipe stubs. The connecting blocks can thus be made of a metal which is resistant to urea.

By means of the heatable connecting blocks, the entire conduit branch of the urea solution from the supply vessel to the exhaust-gas conduit is provided with the capability for continuous, direct heating. There is no longer a cold bridge within the conduit branch.

BRIEF DESCRIPTION OF THE DRAWINGS

The invention will now be described with reference to the drawings wherein:

FIG. 1 shows a schematic of an elongated profile which is interrupted along the length thereof and which conducts the urea solution and heating water conduits and which ends, split into pairs, at connecting blocks of a unit of a reducing agent system;

FIG. 2a shows, in a schematic view, two socket members which are attached to the unit;

DESCRIPTION OF THE PREFERRED EMBODIMENTS OF THE INVENTION

Figure 3:
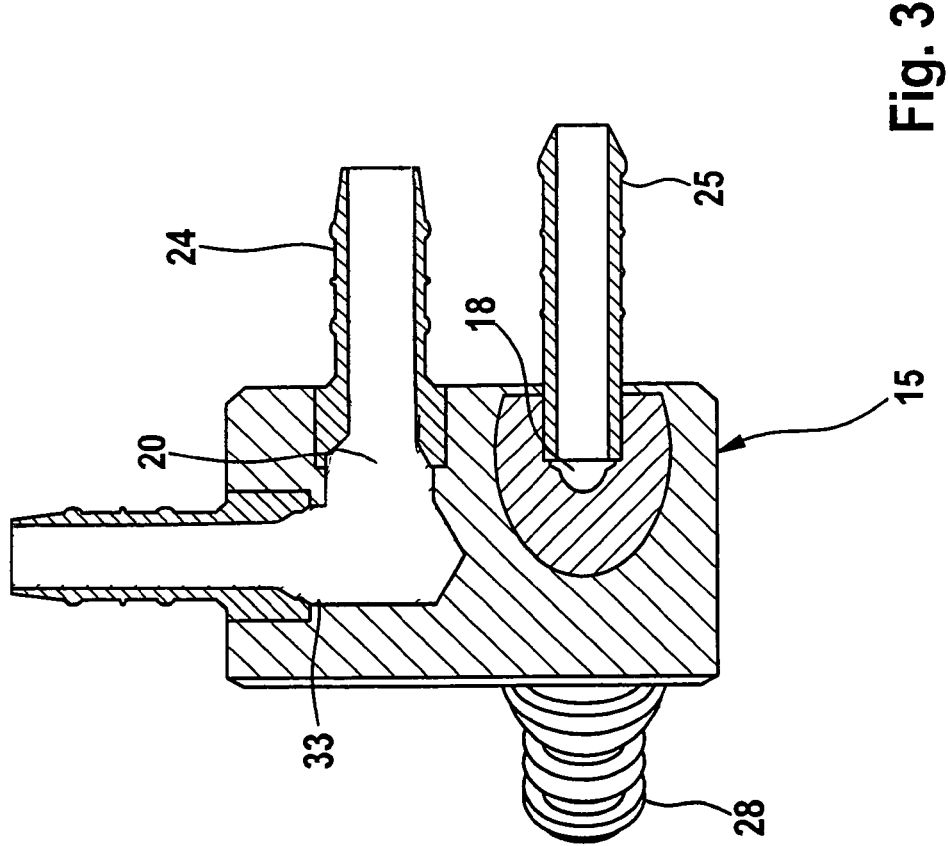
FIG. 3 shows a longitudinal section through the connecting block in the plane of the throughflow bores.

In an elongated profile 5, which is produced from elastomeric material and which has a circular circumference, four hose conduits (6, 7, 8 and 9) are clipped into corresponding peripheral recesses of the elongated profile 5 (FIG. 1). The hose conduits (6, 7, 8 and 9) are connected with their one end to a reducing agent supply vessel (tank) which is not shown here. The hose conduits 6 and 8 form a feed conduit and a return conduit for the urea solution. The hose conduits 7 and 9, which are clipped between hose conduits 6 and 8, conduct heating water and form a feed conduit and a return conduit for the heating water.

The hose conduits (6, 7, 8 and 9) run with the elongated profile 5 to a schematically illustrated feed module 11, from which the required quantity of urea solution is fed to the metering module (not shown). Here, a short distance in front of the feed module 11, the elongated profile 5 is separated axially into two branches 13 and 14. Each branch 13 and 14 thereby contains hose conduit pairs (6, 9) and (8, 7) made up of a urea conduit and a heating water conduit. Each hose conduit pair (6, 9) and (8, 7) is connected at its end to a corresponding connecting block 15 and 16 which, on the surface opposite the hose ends, has a plug-and-socket connector 17 with a plug member 28 (FIG. 2) which is plugged into the unit, in this case, the feed module 11. The connecting block 15 thus forms, via the throughflow channel 18, a fluid connection for the urea return conduit 8, and the connecting block 16 thus forms a fluid connection for the urea feed conduit 6 to the feed module 11. Arrow 8a indicates the return direction of the urea in conduit 8 and arrow 6a indicates feed flow of urea in conduit 6 to the feed module 11.

The connecting blocks 15 and 16, which have in each case one throughflow channel 20 for the heating water, are connected to one another by means of a heating water hose conduit 19.

The heating water which is conducted in via the hose conduit 7 is deflected radially in the connecting block 15 and is conducted via the connecting hose conduit 19 to the other connecting block 16, enters the latter and then leaves the latter via the hose conduit 9 which forms the heating water return conduit. The heating water and urea solution therefore flow in the conduit system in opposite directions. In other applications, it is also possible to obtain the heating effect by means of media flowing in the same direction.

Figure 2:
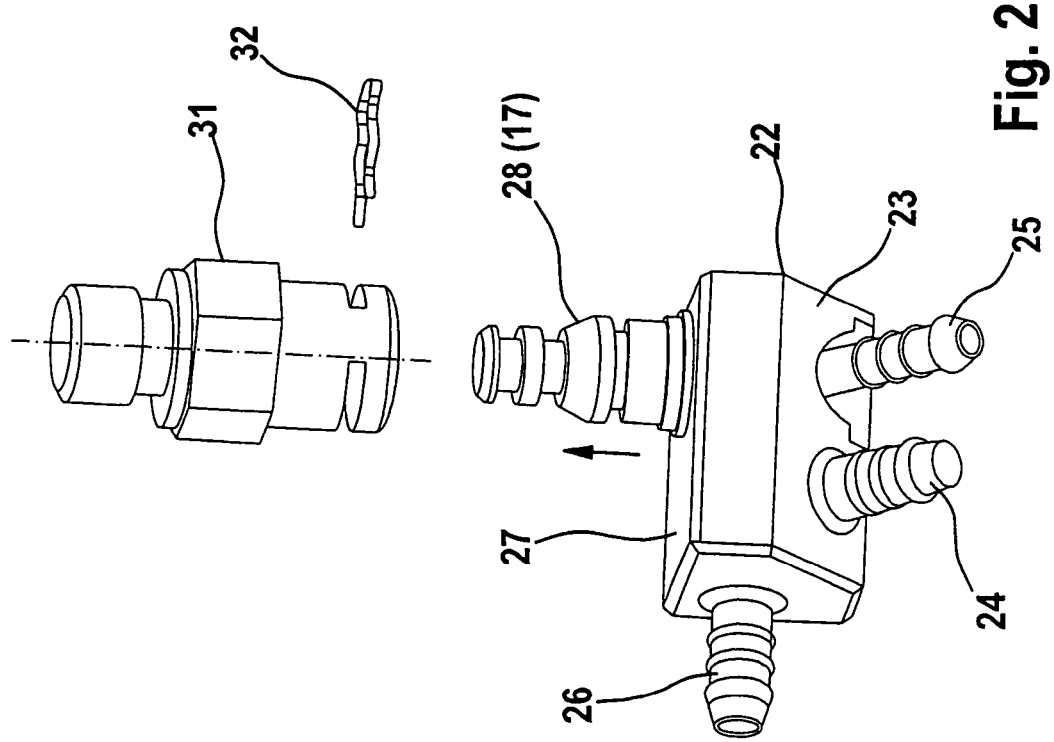
FIG. 2 shows, in a perspective view, a connecting block with a plug member of a plug-and-socket connector which can be plugged and fixed in a socket member which is attached to the unit.

The connecting block 15, which is shown in FIG. 2, is formed so as to be substantially cuboidal, with the front side 22 having a sloping front surface 23. Two hose nipples 24 and 25 project out of said sloping front surface 23, onto which hose nipples 24 and 25 the ends of a hose line pair (not shown here) comprising a heating water hose conduit and a urea hose conduit are pushed and fastened. A further hose nipple 26 is attached to the side, onto which hose nipple 26 a heating water hose (not shown here) which forms a return conduit can be plugged and secured. Attached to the top surface 27 of the connecting block 15 is a plug member 28 which is provided with a central bore and which can be inserted into a socket member 31. The socket member 31 is fastened to the housing (schematically shown in FIG. 2a) of the unit 11 and can be latched therein by means of a U-shaped holding spring 32.

As can be seen from FIG. 3, the hose nipple 24 of the heating water hose conduit is inserted and soldered into a throughflow channel 20 in the connecting block. The throughflow channel 20 runs within the connecting block 15 at right angles up to an outlet opening 33 in which the hose nipple 26 for the return conduit of the heating water is seated. The hose nipple 25 for the hose conduit which conducts the urea solution is inserted parallel and adjacent to the first hose nipple 24, and the hose nipple 25 is aligned with a throughflow channel 18 which ends, with an obtuse-angled course, in an outlet opening in which the plug member 28 is inserted.

Figure 4:
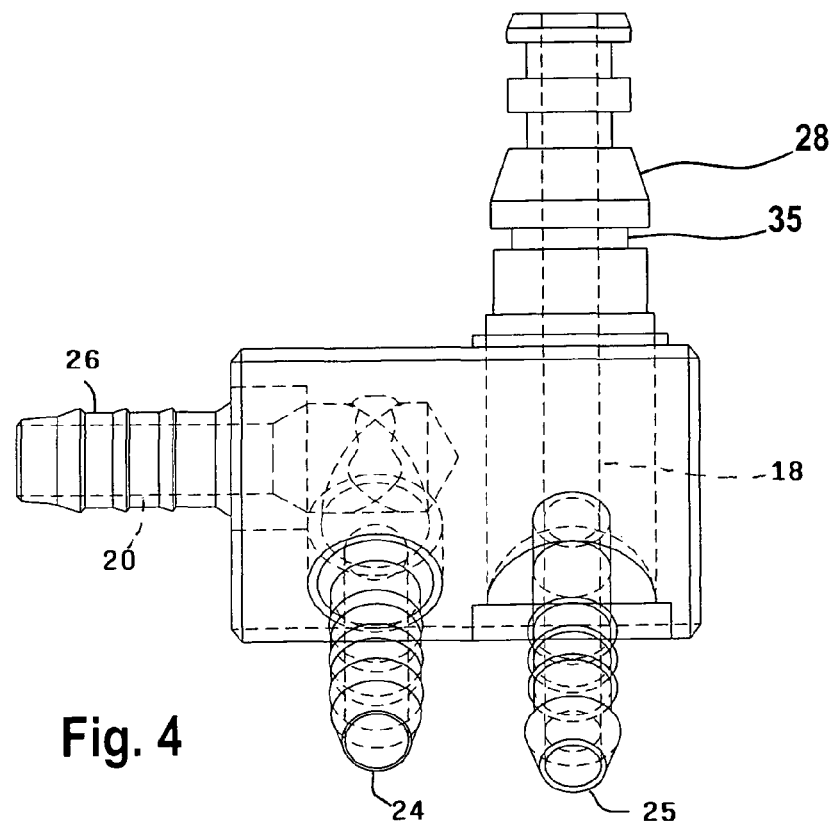
FIG. 4 shows a front view of the connecting block with the throughflow bores shown in phantom outline.

The arrangement of the hose nipples (24, 25 and 26) and of the plug member 28, and the course of the throughflow channels 18 and 20, which connect them, can be seen schematically in FIG. 4 wherein the throughflow channels are shown by dashed lines.

Figures 5, 6, 7:
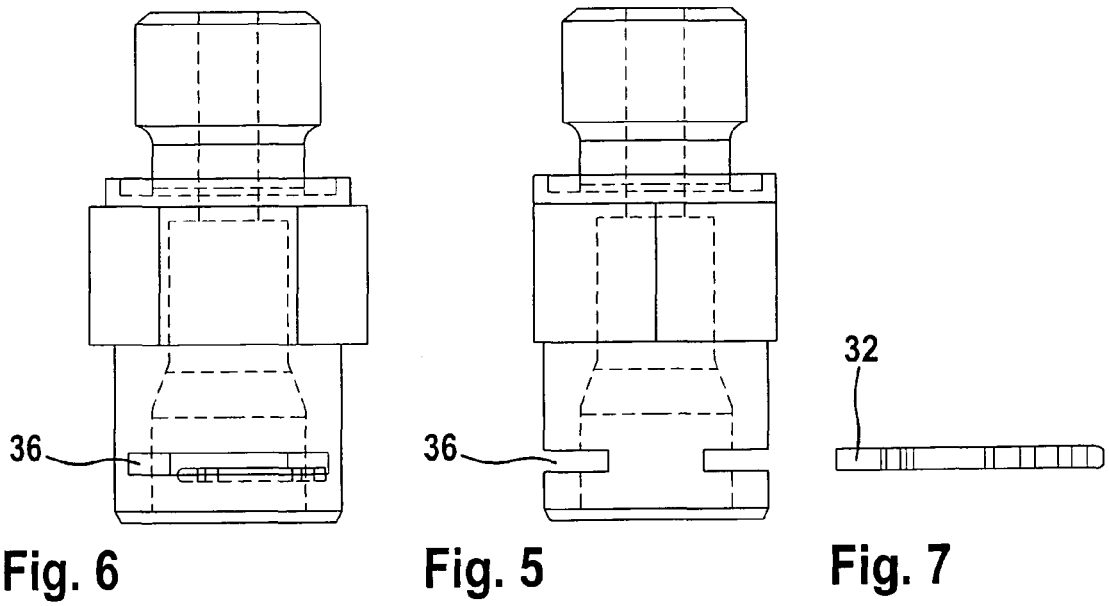
FIG. 5 and FIG. 6 show two views of the socket member, which is fixedly arranged on the unit, for receiving the plug member of the connecting block.
FIG. 7 shows a U-shaped spring which secures the two members which are to be plugged into one another.

In FIGS. 5 and 6, the socket member 31, which is arranged on the feed module housing 11, is shown for receiving the plug member 28. After the insertion of the plug member 28 into the socket member 31, a peripheral slot 35 of the plug member 28 and slot openings 36, which are formed at both sides in parallel in the socket member 31, are coincident such that the two members 28 and 31 can be latched to each other by inserting a U-shaped holding spring 32.

Figure 8:
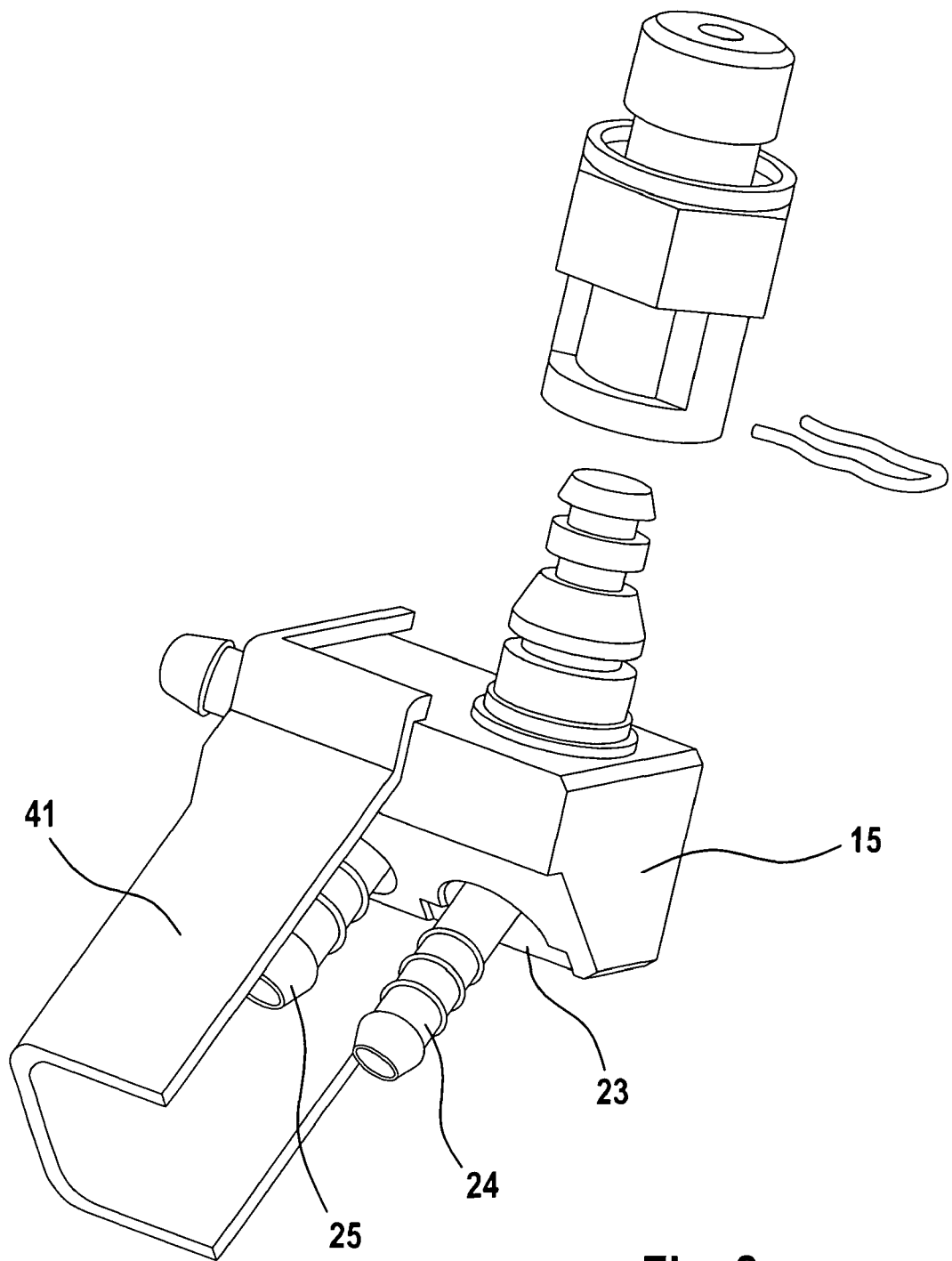
FIG. 8 shows a connecting block whose two inlet hose nipples are covered by a cover cap.

FIG. 8 shows a half cover cap 41 which can be clipped onto the connecting block 15 and which extends over the inlet hose nipple 24. A second covering cap (not shown) leads to the complete protection of the end connection regions on the sloping surface 23 of the connecting block 15.

Figure 9:
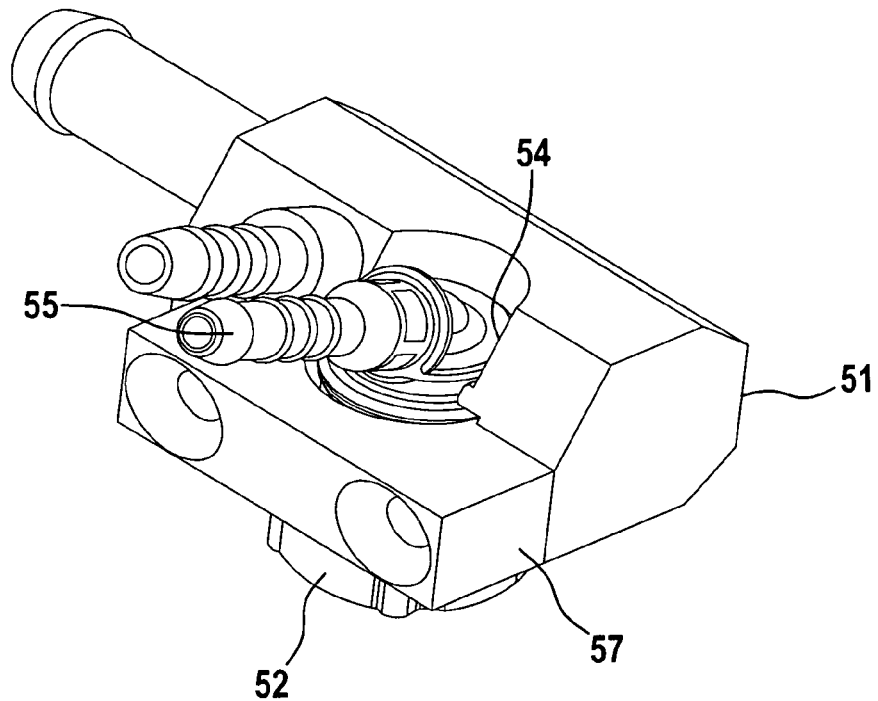
FIG. 9 shows a modified embodiment of a connecting block which is to be connected to the unit and which has a socket connecting member; and, FIG. 10 shows an exploded view of the connecting block shown in FIG. 9.
Figure 10:
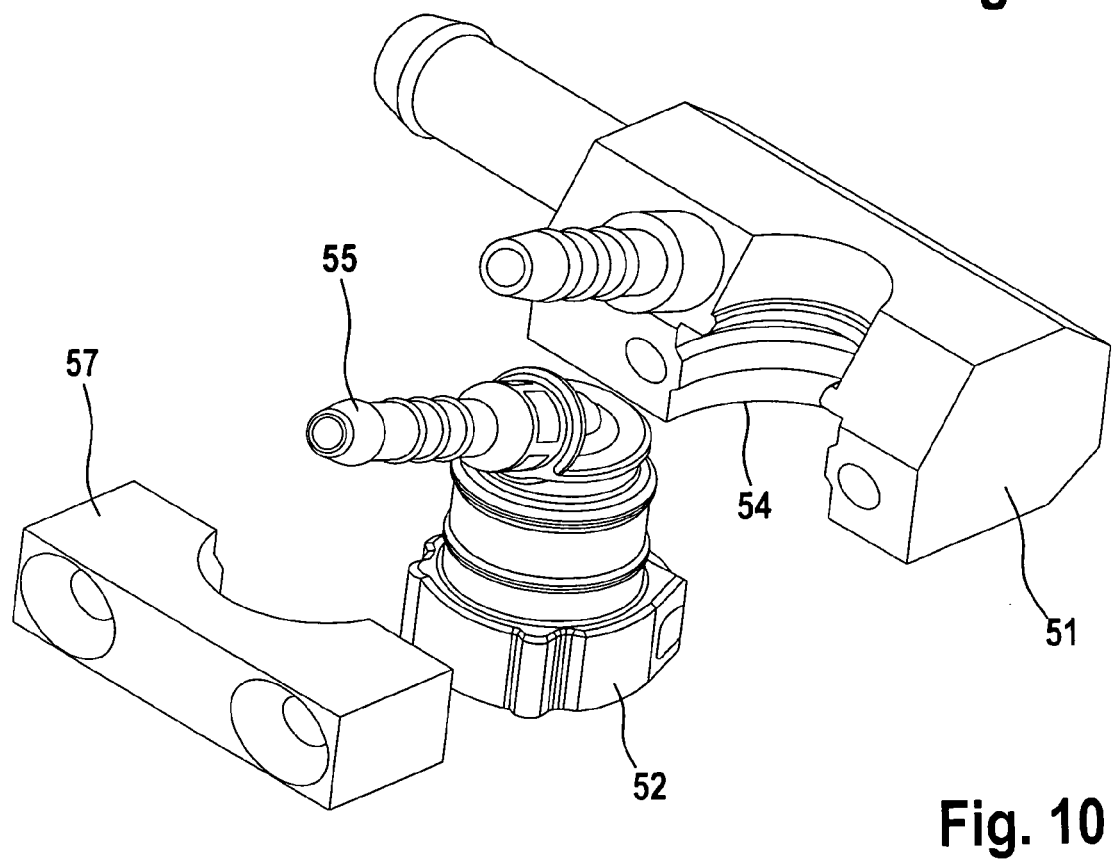

The modified connecting block 51 shown in FIGS. 9 and 10 has a socket member 52 as a connecting member which is plugged onto and secured on a plug member which is provided on the corresponding unit to be connected. For this purpose, the socket member 52 is inserted into a recess 54 of the main body of connecting block 51. To permanently secure the socket member 52, which leads to the hose nipple 55, a holding bracket 57 is screwed onto the connecting block 51 so as to enclose the socket member 52.

It is understood that the foregoing description is that of the preferred embodiments of the invention and that various changes and modifications may be made thereto without departing from the spirit and scope of the invention as defined in the appended claims.

LIST OF REFERENCE NUMERALS

5 Elongated profile
6 Hose conduit, urea solution
7 Hose conduit, heating water
8 Hose conduit, urea solution
9 Hose conduit, heating water
11 Feed module
13 Elongated profile branch
14 Elongated profile branch
15 Connecting block
16 Connecting block
17 Plug-and-socket connector
18 Throughflow channel, urea solution
19 Heating water hose
20 Throughflow channel, heating water
22 Front side
23 Sloped front surface
24 Hose nipple
25 Hose nipple
26 Hose nipple
27 Cover surface
28 Plug member
31 Socket member
32 Holding spring
33 Outlet opening
35 Peripheral slot
36 Slot openings
41 Cover cap
51 Connecting block
52 Socket member
54 Recess
55 Hose nipple
57 Holding bracket

What is claimed is:

1. A heatable hose conduit system for an exhaust-gas aftertreatment arrangement of an internal combustion engine generating an exhaust gas during the operation thereof wherein a liquid urea reducing agent is introduced into the exhaust gas of the engine to effect a selective catalytic reduction of nitrous oxide from the exhaust gas, the aftertreatment arrangement including a vessel unit for accommodating the reducing agent, a pump unit to move the reducing agent and a metering unit having a metering valve for injecting the reducing agent into a flow of the exhaust gas ahead of a catalytic converter, the heatable hose conduit system comprising:

a first conduit and a second conduit conjointly defining a first conduit pair for conducting said liquid urea reducing agent between two of said units;

a third conduit and a fourth conduit conjointly defining a second conduit pair for conducting heated water between said two units;

said first and second conduit pairs being arranged in close proximity to each other so as to facilitate a transfer of heat from said second conduit pair to said first conduit pair;

first and second heatable connecting blocks;

said first conduit and said third conduit each having an end terminating at said first heatable connecting block;

said first heatable connecting block and one of said units conjointly defining a first interface and said one unit having an interior;

a first plug-and-socket connector disposed at said first interface and said first plug-and-socket connector having a plug member and a socket member;

said first heatable connecting block having one of said members for mating with the other one of said members;

said first heatable connecting block having a first throughflow channel communicating with the interior of said one unit via said first plug-and-socket connector for conducting said reducing agent between said interior and said first conduit;

said first heatable connecting block having a second through-flow channel for conducting said heated water running in said third conduit through said first connecting block to thaw out and warm said first heatable connecting block;

said second through-flow channel having an outlet lying external to said one unit;

said second conduit and said fourth conduit each having an end terminating at said second heatable connecting block;

said second heatable connecting block and said one unit conjointly defining a second interface;

a second plug-and-socket connector disposed at said second interface and having a plug member and a socket member mating with each other;

said second connecting block having a first through-flow channel communicating with the interior of said one unit via said second plug-and-socket connector for conducting said reducing agent between said interior from said second conduit;

said second heatable connecting block having a second through-flow channel for conducting said heated water running in said fourth conduit through said second heatable connecting block to thaw out and warm said second heatable connecting block;

said second through-flow channel of said second connecting block having an outlet lying external to said one unit; and, a connecting conduit connecting said outlet of said first heatable connecting block to said outlet of said second heatable connecting block for conducting said heated water between said third conduit and said fourth conduit thereby bypassing said one unit.

2. The heatable hose conduit system of claim 1, further comprising an elongated profile having elongated cutouts formed therein for accommodating respective ones of said conduits therein for facilitating a transfer of heat from said second conduit pair to said first conduit pair.

* * * * *